Patented Aug. 19, 1952

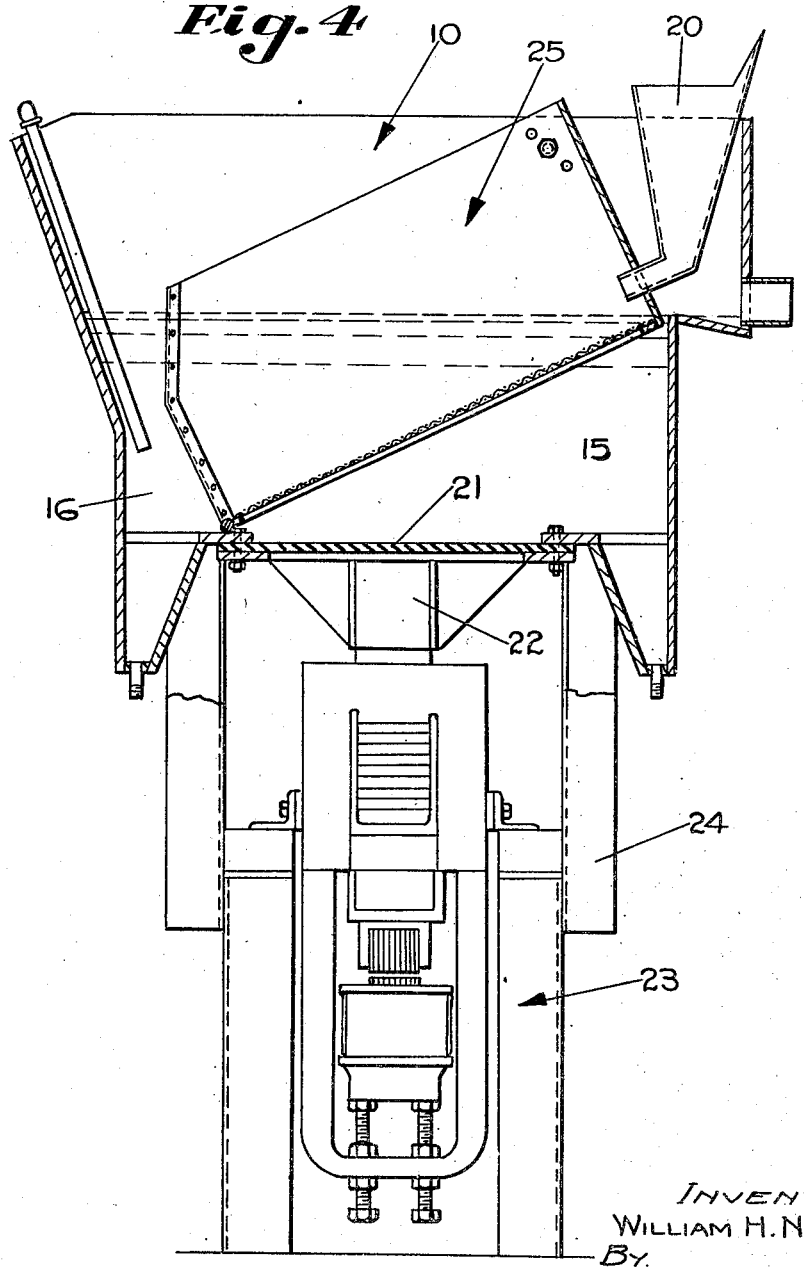

2,607,490

UNITED STATES PATENT OFFICE 2,607,490

SEPARATING SCREEN AND ASSOCIATED HIGH-FREQUENCY FLUID VIBRATING MECHANISM

William H. Newton, Blacklick, Ohio, assignor to The Jeffrey Manufacturing Company, a corporation of Ohio Application August 25, 1950, Serial No. 181,547

4 Claims. (Cl. 209—270)

This invention relates to a separating screen, and an object of the invention is to provide a screen which separates granular material, particularly fine granular material, in the presence of pulsating fluid, either liquid or gaseous, preferably the former, which is pulsated at a relatively high frequency of the order of three thousand vibrations per minute or greater.

Other objects of the invention will appear hereinafter, the novel features and combinations being set forth in the appended claims.

In the accompanying drawings:

Fig. 4 is a view similar to Fig. 1 of a modified arrangement incorporating certain features of my invention.

Figure 1:
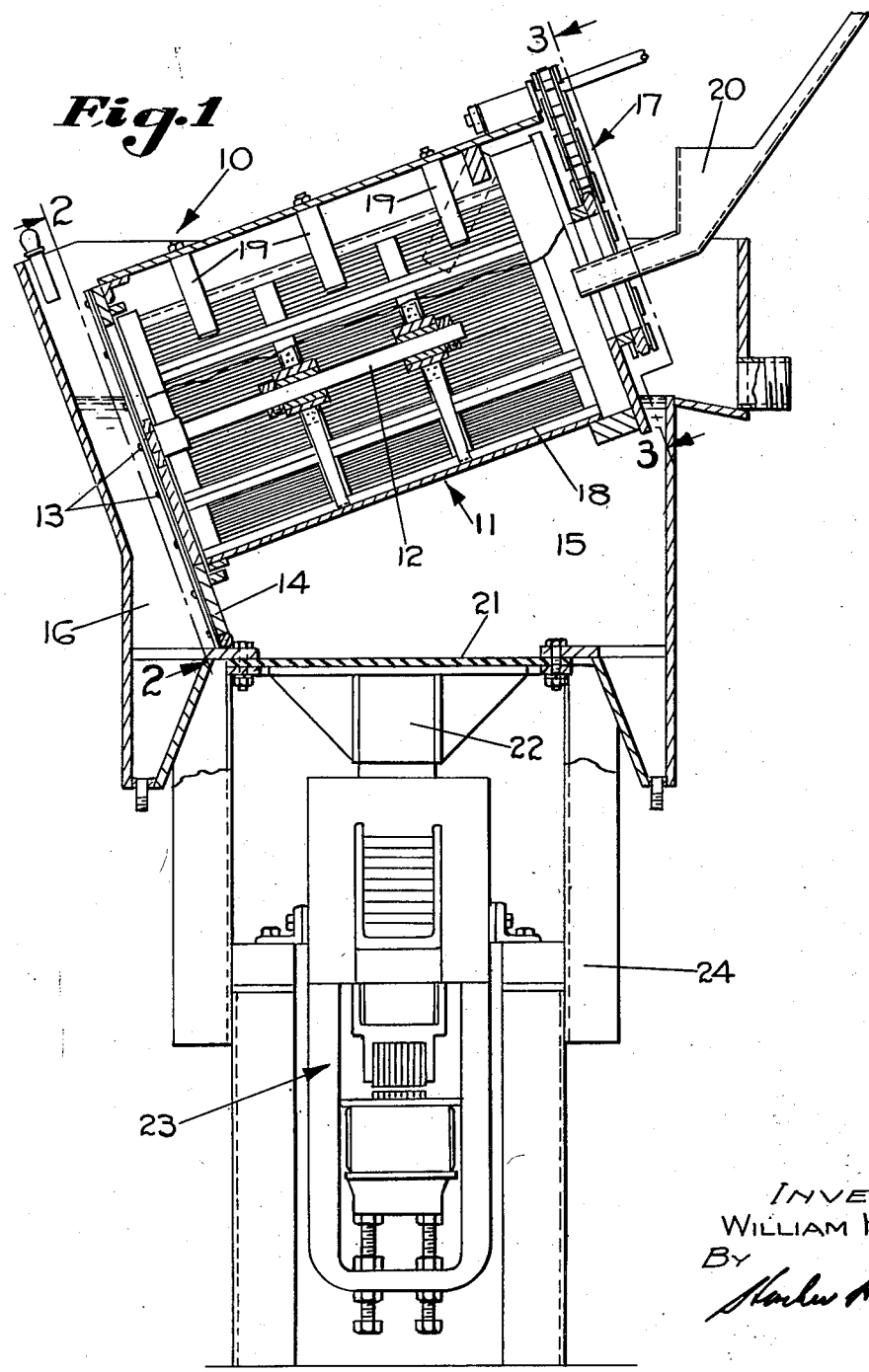
Fig. 1 is an elevational view with parts in section, showing an apparatus involving my invention.

Referring to Fig. 1 of the drawings there is illustrated a fluid container 10 adapted to hold a liquid, such as water or the like, within which there is positioned a trommel type rotary screen 11, at least a portion of which is adapted to extend below the normal liquid level of the liquid in container 10, as illustrated in Fig. 1 of the drawings.

Figure 2:
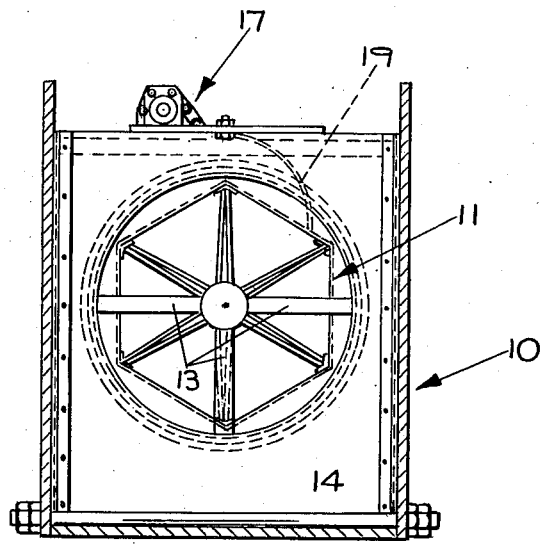
Fig. 2 is a view taken along the line 2—2 of Fig. 1, looking in the direction of the arrows.
Figure 3:
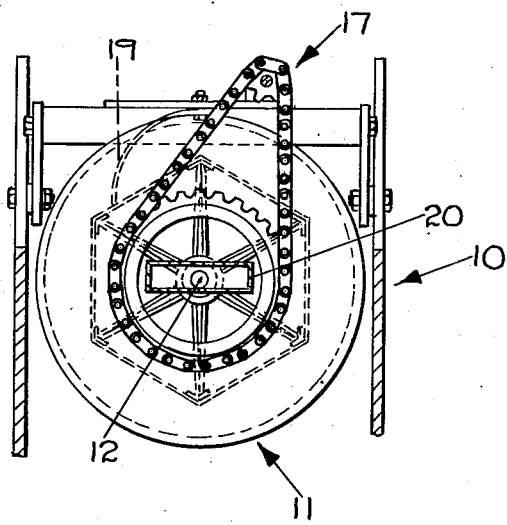
Fig. 3 is a view taken along the line 3—3 of Fig. 1, looking in the direction of the arrows.

The trommel screen 11 is generally of well known construction and is mounted for rotation on a cantilever shaft 12 supported by a T-shaped framework 13 (see Fig. 2) and which extends into a generally circular opening in a divided partition 14 which forms undersize and oversize compartments 15 and 16, respectively, in the container 10. The screen 11 is rotated by means of chain and sprocket drive mechanism 17 (see Figs. 1 and 3), the drive shaft of which is driven from an appropriate motor, not shown.

One important characteristic of the trommel screen 11, insofar as one aspect of my invention is concerned, is that the screen cloth is formed of unwoven, parallel, longitudinally extending individual wires 18 which are closely positioned so as to provide a relatively fine mesh screen, such as illustrated in Heller Patent No. 2,220,106, dated November 5, 1940. Cleaning, plucking devices 19 are preferably provided to pluck the individual strings to prevent any tendency to blinding.

A feed chute 20 is provided to feed relatively fine granular material to the interior of the screen 11 or to the upper surface thereof in case a flat screen is employed, such as illustrated in Fig. 4 of the drawings.

It has been found that blinding of the screen is minimized and a very efficient separation of fine granular materials may be effected without subjecting the screen itself to vibration by imparting to the fluid within the container 10 vibration, preferably of a high frequency, so that the fluid will pulsate through the screen or screen cloth.

It has been found from experimentation that if the frequency of the pulsations is at the rate of three thousand per minute or greater and with a relatively small amplitude, for example, $\frac{1}{32}$ of an inch, the efficiency of operation is improved as compared with that obtained by lower frequency vibration which is normally accompanied by greater amplitude. To this end I provide a flexible diaphragm 21, forming a portion of the bottom of the container 10, which is attached to a vibratory armature 22 of a vibratory electromagnetic motor 23 resiliently mounted upon a frame 24 which also preferably supports container 10.

The vibratory motor 23 preferably follows the construction disclosed in Flint Patent No. 2,094,698, dated October 5, 1937.

In Fig. 4 of the drawings there is illustrated a modified form of the invention which incorporates some but not all of the features of the apparatus above described. The differences are obvious and need no special description except to point out that a flat screen 25 has been substituted for the rotary or trommel screen 11.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In combination, a fluid container, a rotary screen extending into said container with at least one of its end portions being submerged whereby material thereabove will be separated while submerged in the liquid in said container and while below the normal liquid level thereof, means for feeding material to be separated to said screen wherein the undersize will pass through the screen to a compartment therebelow, means to isolate the oversize passing over said screen, and means including an electrical vibrator operable to cause pulsating fluid flow through said screen at a frequency of 3000 vibrations per minute or greater.

2. In combination, a fluid container, a screen extending into said container with at least one of its end portions being submerged whereby material thereabove will be separated while submerged in the liquid in said container and while below the normal liquid level thereof, means for feeding material to be separated to said screen wherein the undersize will pass through the screen to a compartment therebelow, means to isolate the oversize passing over said screen, means including an electrical vibrator operable to cause pulsating fluid flow through said screen at a frequency of 3000 vibrations per minute or greater, and means associated with said screen to prevent blinding thereof.

3. In combination, a fluid container, a rotary screen extending into said container with at least one of its end portions being submerged whereby material thereabove will be separated while submerged in the liquid in said container and while below the normal liquid level thereof, means for feeding material to be separated to said screen wherein the undersize will pass through the screen to a compartment therebelow, means to isolate the oversize passing over said screen, and means including an electrical vibrator operable to cause pulsating fluid flow through said screen at a frequency of 3000 vibrations per minute or greater, said rotary screen being of the trommel type and the screen cloth being formed of individual parallel longitudinally extending wires.

4. A separating apparatus particularly adapted to separate fine granular materials in the presence of pulsating liquid, said apparatus including a liquid container, a generally cylindrical rotary screen rotating on an axis making an acute angle with the surface of the liquid normally contained within said liquid container, said screen having at least a portion extending into said liquid container and below the normal level of the liquid therein, means for rotating said screen on said axis, means for feeding material to be separated to the interior of said screen wherein the undersize will pass through the screen, means to isolate the average granular materials passing axially through said screen, means including an electrical vibrator operable to cause pulsating fluid flow through said screen at a frequency of 3000 vibrations per minute or greater, said screen including individual parallel longitudinally extending wires, and plucker means adapted to pluck said wires as said screen rotates thereby aiding in preventing blinding of said screen.

WILLIAM H. NEWTON.

REFERENCES CITED

The following references are of record in the file of this patent:

UNITED STATES PATENTS

| Number | Name | Date |
| --- | --- | --- |
| 2,138,810 | Wood | Nov. 29, 1938 |
| 2,276,631 | Smith | Mar. 17, 1942 |
| 2,358,970 | Gray | Sept. 26, 1944 |